United States Patent
Jackson

(10) Patent No.: US 10,445,597 B2
(45) Date of Patent: Oct. 15, 2019

(54) SYSTEMS AND METHODS FOR IDENTIFICATION OF OBJECTS USING AUDIO AND SENSOR DATA

(71) Applicant: Toyota Research Institute, Inc., Los Altos, CA (US)

(72) Inventor: Astrid Glende Jackson, Lake Mary, FL (US)

(73) Assignee: Toyota Research Institute, Inc., Los Altos, CA (US)

( * ) Notice: Subject to any disclaimer, the term of this patent is extended or adjusted under 35 U.S.C. 154(b) by 108 days.

(21) Appl. No.: 15/786,106

(22) Filed: Oct. 17, 2017

(65) Prior Publication Data

US 2019/0114489 A1    Apr. 18, 2019

(51) Int. Cl.
| | |
|---|---|
| G06K 9/00 | (2006.01) |
| G06K 9/62 | (2006.01) |
| G06K 9/46 | (2006.01) |
| G10L 15/065 | (2013.01) |
| G10L 15/08 | (2006.01) |

(52) U.S. Cl.
CPC ........... *G06K 9/00805* (2013.01); *G06K 9/46* (2013.01); *G06K 9/6268* (2013.01); *G10L 15/065* (2013.01); *G10L 15/083* (2013.01); *G06K 9/6289* (2013.01); *G06K 2209/21* (2013.01)

(58) Field of Classification Search
None
See application file for complete search history.

(56) References Cited

U.S. PATENT DOCUMENTS

| | | | |
|---|---|---|---|
| 6,763,148 B1 | 7/2004 | Sternberg et al. | |
| 8,457,360 B2 | 6/2013 | Robert et al. | |
| 8,660,355 B2* | 2/2014 | Rodriguez | G06K 9/00973 382/118 |
| 9,064,152 B2 | 6/2015 | Lord et al. | |
| 9,202,254 B2 | 12/2015 | Rodriguez et al. | |
| 9,760,806 B1* | 9/2017 | Ning | B60W 50/14 |
| 9,972,339 B1* | 5/2018 | Sundaram | G10L 17/04 |
| 10,134,421 B1* | 11/2018 | Sundaram | G10L 17/04 |
| 2013/0142393 A1 | 6/2013 | Lord et al. | |
| 2017/0174227 A1* | 6/2017 | Tatourian | G06K 9/00805 |
| 2017/0220874 A1* | 8/2017 | Ayvaci | G06T 7/13 |
| 2017/0293811 A1* | 10/2017 | Zhai | B60W 30/12 |
| 2018/0068206 A1* | 3/2018 | Pollach | G06K 9/00791 |
| 2018/0216958 A1* | 8/2018 | Park | G06Q 30/02 |
| 2018/0217254 A1* | 8/2018 | Hong | H01Q 1/32 |

\* cited by examiner

*Primary Examiner* — Nancy Bitar
(74) *Attorney, Agent, or Firm* — Christopher G. Darrow; Darrow Mustafa PC

(57) ABSTRACT

System, methods, and other embodiments described herein relate to identifying objects using audio data in combination with sensor data. In one embodiment, a method includes, in response to acquiring audio data from at least one microphone integrated with the vehicle and feature data from at least one sensor of the vehicle, analyzing, using a deep learning algorithm, the feature data to generate a classification of an object embodied by the feature data. The method includes selectively refining the classification as a function of at least the audio data to further identify the object using the classification. The classification identifies at least characteristics about a shape and size of the object. The method includes controlling one or more vehicle systems of the vehicle according to the classification.

20 Claims, 7 Drawing Sheets

SYSTEMS AND METHODS FOR IDENTIFICATION OF OBJECTS USING AUDIO AND SENSOR DATA

TECHNICAL FIELD

The subject matter described herein relates in general to systems for identifying objects and, more particularly, to using audio to refine the identification of objects from images or another source.

BACKGROUND

Locating and/or identifying objects in an environment using electronic means such as light detection and ranging (LIDAR) sensors, cameras, radar or other sensors can be a complex task. For example, the sensors may not perceive aspects of the surroundings that are beyond a particular distance (e.g., sensing range of the sensors). Moreover, a field-of-view of the noted sensors can be obstructed by objects within the surrounding environment such as buildings, trees, and other vehicles causing the sensors to potentially fail to detect partially occluded objects in the obstructed areas. Additionally, particular objects may generally be more difficult to detect because of associated shapes and/or particular poses. For example, systems may encounter difficulties detecting bicycles because of the general open design of bicycle frames and minimal front and rear profiles.

Moreover, when the scanning vehicle is operating in an autonomous mode, the vehicle uses the sensors to build an obstacle map of objects in the surrounding environment that facilitates avoiding objects within the surrounding environment. However, because some objects may be undetected due to being partially obstructed or otherwise difficult to detect, the obstacle map may not provide a complete perception of the surrounding objects. As a result, the vehicle may encounter unforeseen obstacles causing erratic maneuvers or other undesirable effects.

SUMMARY

Example systems and methods are disclosed herein that relate to a manner of detecting objects based, at least in part, on audio data. For example, in one aspect, an example vehicle may be equipped with multiple microphones situated at different locations on the vehicle to acquire audio data from different areas around the vehicle. Additionally, while collecting the audio data, the vehicle also collects other sensor data such as images from cameras, 3D point cloud data from LIDAR, radar data, and so on. Thus, the vehicle uses the sensor data to identify and locate objects in the surrounding environment. However, as previously indicated, sometimes objects in the surrounding environment are not identifiable because of various circumstances such as occlusions, inadequate sensor data, and so on.

Accordingly, the disclosed fusion system uses the audio data obtained from the microphones integrated with the vehicle to further inform identification of the objects. That is, in addition to using the noted sensor data from cameras and other sensors, the fusion system uses the audio data to determine additional information such as a present context that can facilitate identifying the object. In one embodiment, the fusion system initially analyzes the sensor data to identify a classification of an object perceived by a sensor such as a camera. In general, the classification identifies a type of the object, a general shape, and/or further information about the object. However, if the object is partially occluded or cannot otherwise be fully identified, the classification can indicate a confidence interval of the classification or other indicator of this circumstance. Thus, the fusion system can then analyze the audio data either separately or in concert with the other sensor data to determine further aspects of the object that facilitate identification.

Additionally, or alternatively, the fusion system may also analyze the audio data before analyzing the sensor data to determine a present context that can further inform the analysis of the sensor data in order to improve an initial classification. That is, the fusion system, in one embodiment, first analyzes the audio data to determine aspects such as the presence of traffic, pedestrians, etc., and then analyzes the sensor data to identify particular objects. In either case, the fusion system leverages the audio data to improve recognition of objects that are perceived by various vehicle sensors. In this way, the fusion system improves situational awareness of vehicle occupants and/or vehicle systems (e.g., autonomous driving systems, advanced driving assistance systems (ADAS), etc.) so that the vehicle can be controlled to more safely navigate the surrounding environment.

In one embodiment, a fusion system for identifying aspects of a surrounding environment of a vehicle is disclosed. The fusion system includes one or more processors and a memory that is communicably coupled to the one or more processors. The memory stores a monitoring module including instructions that when executed by the one or more processors cause the one or more processors to, in response to acquiring audio data from at least one microphone integrated with the vehicle and feature data from at least one sensor of the vehicle, analyze, using a deep learning algorithm, the feature data to generate a classification of an object embodied by the feature data. The memory stores an identification module including instructions that when executed by the one or more processors cause the one or more processors to selectively refine the classification as a function of at least the audio data to further identify the object using the classification. The classification identifies at least characteristics about a shape and size of the object. The identification module further includes instructions to control one or more vehicle systems of the vehicle according to the classification.

In one embodiment, a non-transitory computer-readable medium for identifying aspects of a surrounding environment of a vehicle is disclosed. The non-transitory computer-readable medium stores instructions that when executed by one or more processors cause the one or more processors to perform the disclosed functions. The instructions include instructions to, in response to acquiring audio data from at least one microphone integrated with the vehicle and feature data from at least one sensor of the vehicle, analyze, using a deep learning algorithm, the feature data to generate a classification of an object embodied by the feature data. The instructions include instructions to selectively refine the classification as a function of at least the audio data to further identify the object using the classification. The classification identifies at least characteristics about a shape and size of the object. The instructions include instructions to control one or more vehicle systems of the vehicle according to the classification.

In one embodiment, a method of identifying aspects of a surrounding environment of a vehicle is disclosed. The method includes, in response to acquiring audio data from at least one microphone integrated with the vehicle and feature data from at least one sensor of the vehicle, analyzing, using a deep learning algorithm, the feature data to generate a classification of an object embodied by the feature data. The method includes selectively refining the classification as a function of at least the audio data to further identify the object using the classification. The classification identifies at least characteristics about a shape and size of the object. The method includes controlling one or more vehicle systems of the vehicle according to the classification.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
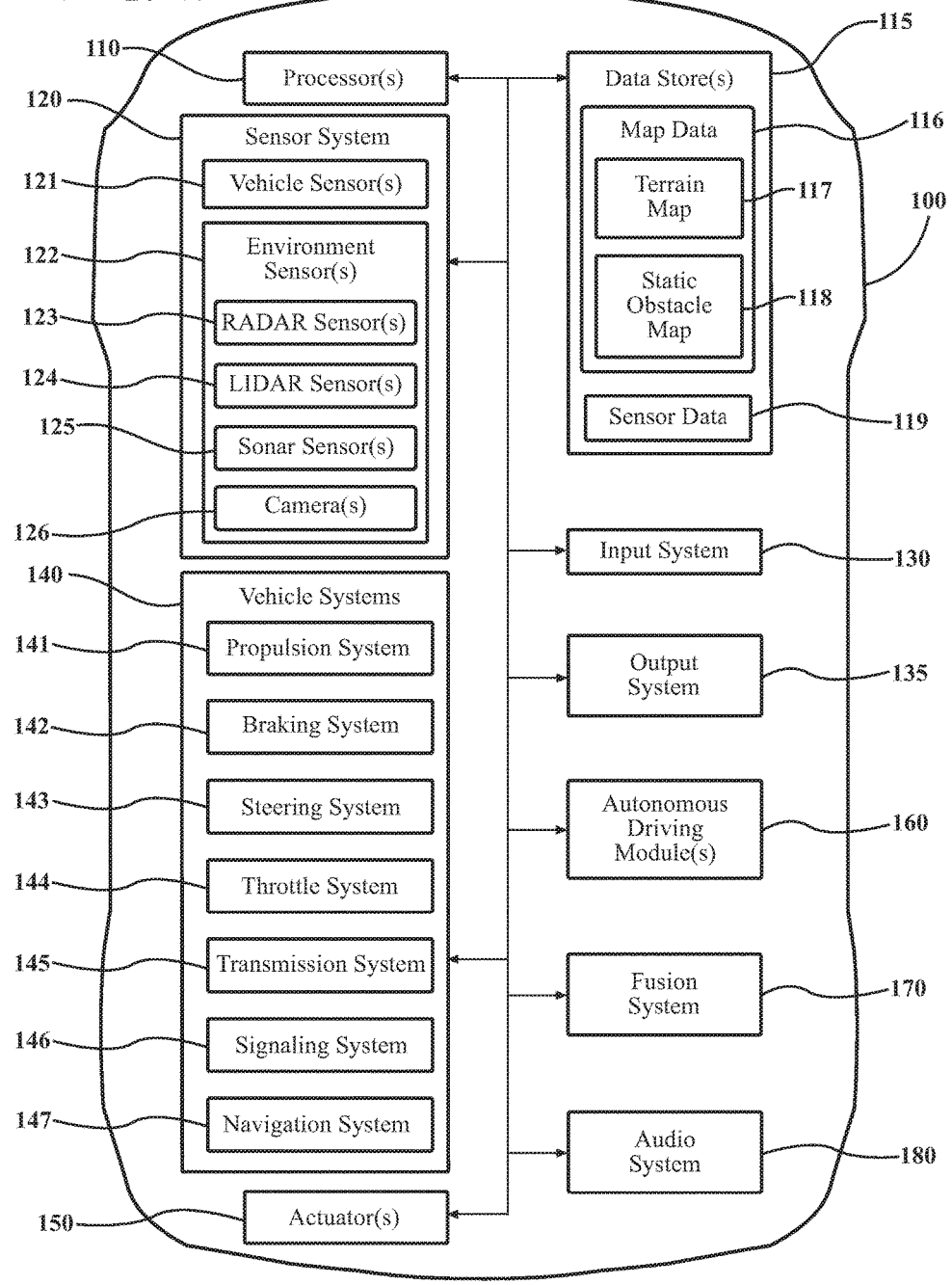
FIG. 1 illustrates one embodiment of a vehicle within which systems and methods disclosed herein may be implemented.

Systems, methods and other embodiments associated with improving awareness about a surrounding environment by using audio data to facilitate detecting objects are disclosed herein. As mentioned previously, perceiving and accurately identifying objects can be a difficult task. That is, because some objects have shapes that are difficult to perceive especially from certain angles, because objects may be partially occluded, and because of other circumstances that influence perception when using electronic sensors, detecting objects via sensor data can be a difficult task.

Accordingly, in one embodiment, a fusion system uses audio data in addition to other forms of sensor data (e.g., images, LIDAR data, etc.) in order to improve perception and thus identification of objects. For example, in one embodiment, multiple microphones are integrated at different locations on the vehicle to acquire audio data from different areas around the vehicle. Additionally, while collecting the audio data, the fusion system simultaneously collects other sensor data such as images from cameras, 3D point cloud data from LIDAR, radar data, and so on.

Thus, the disclosed fusion system uses the audio data obtained from the microphones to further inform identification of the objects. That is, in addition to using the noted sensor data, the fusion system uses the audio data to determine additional information such as a present context relating to the surrounding environment and/or sounds that are particular to an object that can facilitate identifying the object. In one embodiment, the fusion system initially analyzes the sensor data to identify a classification of an object perceived by a sensor such as a camera. However, if the object is partially occluded or cannot otherwise be sufficiently identified, the fusion system can then analyze the audio data either separately or in concert with the other sensor data to determine further aspects of the object that facilitate identification.

Additionally, or alternatively, in one embodiment, the fusion system analyzes the audio data before analyzing the sensor data to determine a present context that can further inform the analysis of the sensor data in order to improve an initial classification. That is, the fusion system, in one embodiment, first analyzes the audio data to determine aspects such as a presence of traffic, pedestrians, animals, or other characteristics of the surrounding environment that can inform identification of objects. Consequently, the fusion system then analyzes the sensor data using the present context to identify particular objects.

In either case, the fusion system leverages the audio data to improve detection and recognition of objects that are perceived by various vehicle sensors. In this way, the fusion system improves situational awareness of vehicle occupants and/or vehicle systems (e.g., autonomous driving systems) so that the vehicle can be controlled to safely navigate the surrounding environment via the improved awareness of objects in the surrounding environment.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport that, for example, benefits from the systems and methods as discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a fusion system 170 that is implemented to perform methods and other functions as disclosed herein relating to using audio data in addition to feature data to detect objects and classify objects to improve identification of objects and knowledge of a surrounding environment of the vehicle 100. The noted functions and methods will become more apparent with a further discussion of the figures.

Moreover, the vehicle 100 is illustrated as including an audio system 180. In one embodiment, the audio system 180 includes microphones integrated with the vehicle at various locations. For example, in various implementations, the audio system 180 includes an array of microphones positioned within an external surface of the vehicle 100 at locations about the vehicle 100 to cover a full 360-degrees of audio perception around the vehicle 100. Thus, the microphones are generally positioned to capture audio from all directions around the vehicle 100. Moreover, the microphones can be positioned at a height on the vehicle 100 to avoid road noise while optimizing acquisition of ambient sounds from the surrounding environment. Thus, in various aspects, the microphones may be placed above a level of the wheels, within a roof panel, within a door panel, or within other locations that facilitate acquiring sounds from objects while avoiding unnecessary noise from the vehicle 100.

Additionally, the microphones of the audio system 180 can be positioned in such a manner as to be shielded from wind noise, weather, etc. In one embodiment, one or more microphones are integrated with side-view mirrors, taillights, or other structures of the exterior of the vehicle 100. Moreover, the microphones may be wirelessly connected with the audio system 180 or directly wired. In further aspects, the audio system 180 implements pre-filtering or other pre-processing techniques on the audio data acquired from the microphones to remove noise or to otherwise optimize the audio data. Furthermore, particular microphones may be tuned to detect particular noises (e.g., curb lane mic may be tuned to detect bicycles) and/or the audio data may be filtered in a particular manner to better detect particular sounds. In general, the fusion system 170 controls or otherwise communicates with the audio system 180 to acquire the audio data. Thus, the fusion system 170, in one embodiment, acquires the audio data from the audio system 180 in a continuous stream. Moreover, the audio data from separate microphones may be provided on separate channels or in another fashion. In either case, the fusion system 170 acquires the audio data and uses the audio data to supplement sensor data from the vehicle sensors 120 when performing object detection.

Figure 2:
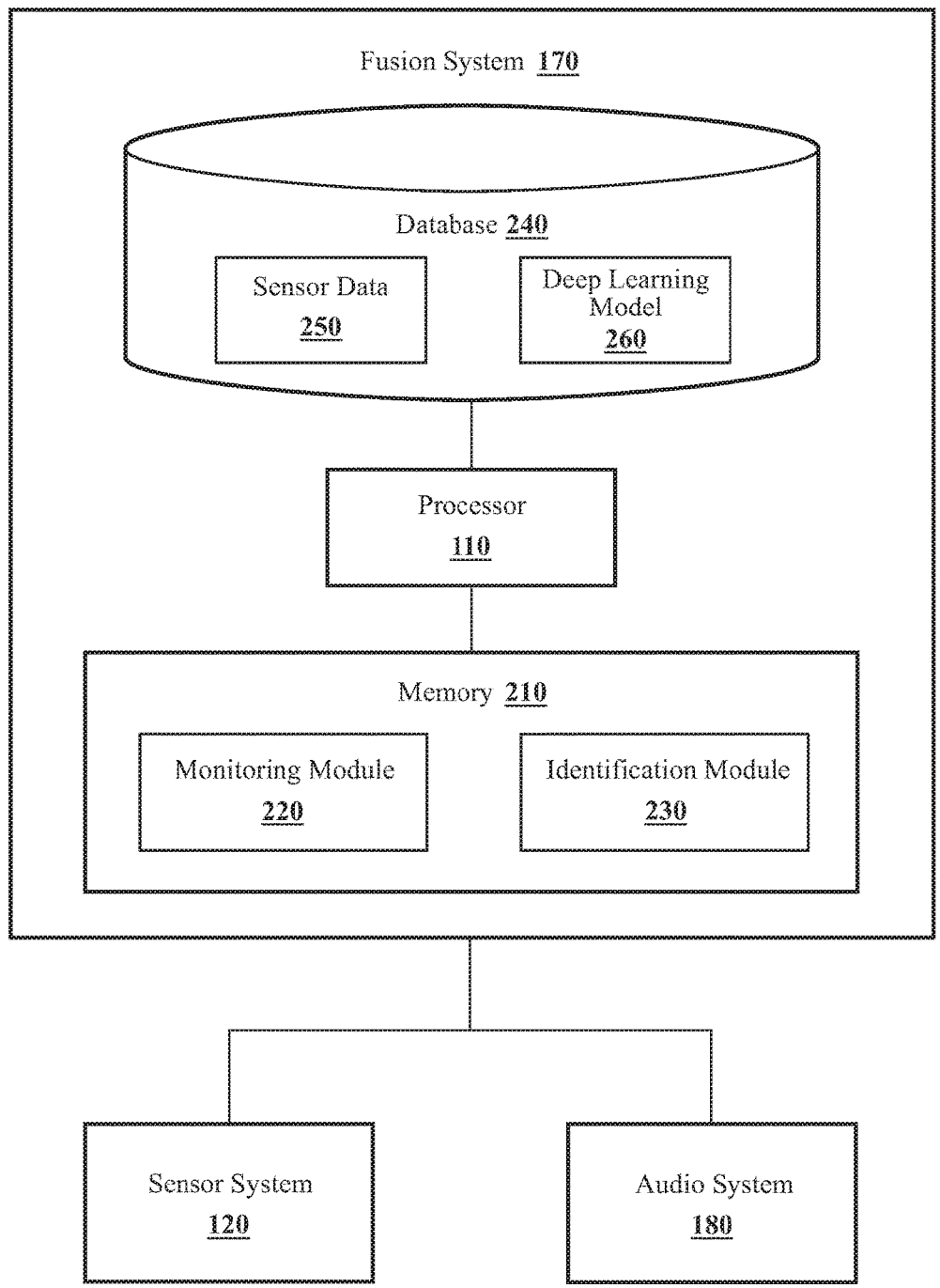
FIG. 2 illustrates one embodiment of a fusion system that is associated with using audio data to supplement object detection.

With reference to FIG. 2, one embodiment of the fusion system 170 of FIG. 1 is further illustrated. The fusion system 170 is shown as including a processor 110 from the vehicle 100 of FIG. 1. Accordingly, the processor 110 may be a part of the fusion system 170, the fusion system 170 may include a separate processor from the processor 110 of the vehicle 100 or the fusion system 170 may access the processor 110 through a data bus or another communication path. In either case, the processor 110 is illustrated as part of the fusion system 170 for purposes of explanation. Additionally, in one embodiment, the fusion system 170 includes a memory 210 that stores a monitoring module 220 and an identification module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

Accordingly, in one embodiment, the monitoring module 220 generally includes instructions that function to control the processor 110 to acquire sensor data 250. As an initial note, as used herein sensor data 250 is used to generally refer to both audio data acquired from the microphones and feature data that is acquired from the vehicle sensors 120. Thus, the monitoring module 220 generally acquires the feature data from, for example, one or more vehicle sensors of the sensor system 120. In one embodiment, the feature data includes data collected from a camera 126, a sonar 125, a LIDAR 124, a radar 123, and/or another sensor integrated with the vehicle 100. In further aspects, the monitoring module 220 controls multiple ones of the noted sensors that are embedded with the vehicle 100. Moreover, in one embodiment, the feature data includes data from multiple sensors of a set such as multiple cameras, multiple lidars, etc.

Figure 3:
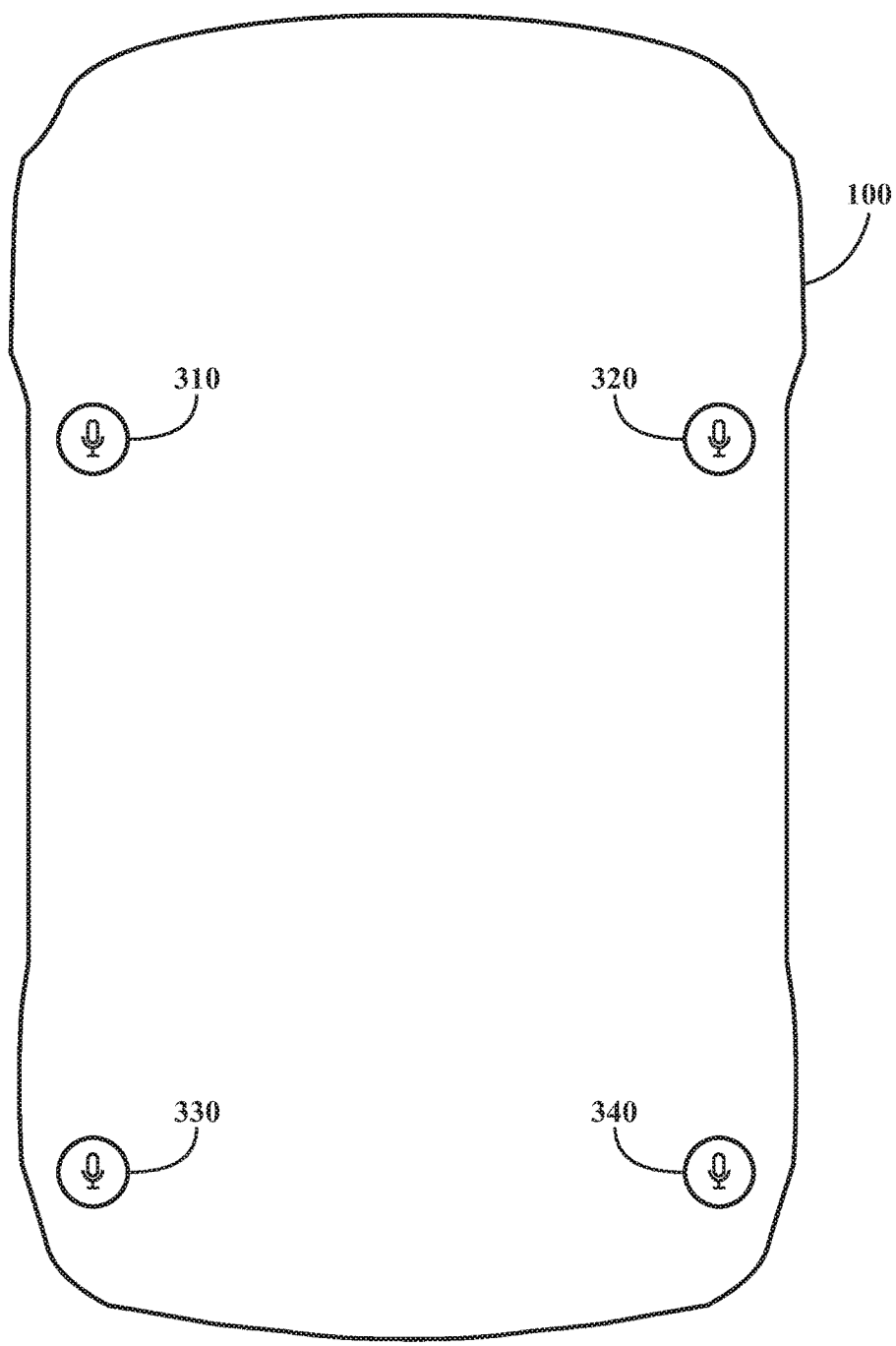
FIG. 3 illustrates an example diagram of a vehicle that is equipped with multiple external microphones.

Additionally, the monitoring module 220 also acquires the audio data as part of the sensor data 250. With brief reference to FIG. 3, one embodiment of the vehicle 100 is illustrated that includes an exemplary configuration of microphones. FIG. 3 is shown with four microphones 310, 320, 330, and 340. The arrangement of microphones shown in FIG. 3 is illustrative of a single embodiment; this arrangement shows how the microphones can be located in order to provide coverage around the vehicle 100 to capture audio from multiple directions. In the illustrated configuration, the microphones 310, 320, 330, and 340 are located on separate quarter panels or in close proximity thereto in order to acquire audio from separate quadrants around the vehicle 100. The microphones may also be integrated with different aspects of the body of the vehicle 100 such as side-view mirrors, lights, spoilers, etc. Moreover, overlap between areas perceived by the microphones provides for the monitoring module 220 localizing the object within the surrounding environment using the correlating audio data from separate microphones. As an additional matter, while four separate microphones are shown, in further aspects, the number of microphones may be greater to provide a finer granularity to the acquired audio or fewer to, for example, minimize an amount of data that is processed.

In either case, the monitoring module 220 collects the feature data and the audio data and stores the two sets of data as the sensor data 250 in database 240. The database 240 is, for example, an electronic data structure stored in the memory 210 or another electronic data store and that is configured with routines that can be executed by the processor 110 for analyzing stored data, providing stored data, organizing stored data, and so on. Thus, in one embodiment, the database 240 stores data used/provided by the modules 220 and 230 in executing various functions. In one embodiment, the database 240 includes the sensor data 250 and a deep learning model 260. Additionally, while the sensor data 250 and the deep learning model 260 are illustrated as being stored within the database 240, it should be understood that in various embodiments the sensor data 250 and/or the deep learning model 260 can be stored in the memory 210, integrated within one or more data structures of the monitoring module 220 and/or the identification module 230, and so on.

As a further matter, while the monitoring module 220 is discussed as collecting the sensor data 250 in the database 240, in various implementations the sensor data 250 is also used by various systems 140 of the vehicle 100 for different purposes. For example, the autonomous driving module 160 and/or other components use the sensor data 250 for simultaneous localization and mapping (SLAM), path planning, obstacle avoidance, and so on.

In either case, the monitoring module 220 generally includes computer-executable instructions to analyze the sensor data 250 using the deep learning model 260. Accordingly, the monitoring module 220, in one embodiment, provides the sensor data 250 as an electronic input into the deep learning algorithm 260 which produces a classification that identifies the object. The classification indicates, in one embodiment, a general shape, a size, a type, and/or other identifying indicia about the object. By way of example, the generated classification may indicate a type of the object as a "car" or "bike" in order to identify a general type of the object. In further aspects, the classification may be generated with a finer granularity and indicate, for example, a model of a car, a color of the car, and so on.

As for the deep learning algorithm itself, the monitoring module 220 includes routines, data structures, data and other aspects that implement the deep learning algorithm 260. Thus, in one or more embodiments, the deep learning algorithm 260 is at least partially embodied by instructions of the monitoring module 220. Furthermore, the deep learning algorithm 260 is, for example, a convolutional neural network (CNN), a recurrent neural network (RNN), a long short-term memory (LSTM) neural network, or another suitable machine learning approach that can identify a classification for objects embodied within the sensor data 250.

As a further matter and as will be discussed in greater detail along with the disclosed methods, the monitoring module 220, in one embodiment, initially processes the audio data that correlates (e.g., temporally and/or spatially) with an object or region of focus that may include an object to produce a present context that informs analysis of the feature data. For example, in one embodiment, prior to analyzing the feature data, the monitoring module 220 analyzes the audio data using the deep learning algorithm 260 or another machine learning algorithm directed to characterizing the audio data. In either case, the monitoring module 220 produces the present context from the audio to identify general aspects relating to the surrounding environment such as a level of traffic, a presence of pedestrians and/or animals, presence of construction equipment/emergency vehicles and more generally the presence of any audio signatures that facilitate identifying objects which are likely in a corresponding environment.

Thus, in one embodiment, the monitoring module 220 feeds the present context into the deep learning algorithm 260 along with the feature data to further improve analysis of the feature data and thus a likelihood of generating a valid classification of an object. Moreover, the identification module 230 generally includes computer-executable instructions to selectively refine the classification when the monitoring module 220 determines the object is partially occluded or cannot otherwise provide the classification with, for example, a confidence interval that satisfies a threshold (e.g., a confidence interval of at least a certain value).

Thus, in general, the classification produced by the monitoring module 220 is an initial attempt at identifying the object. Accordingly, the classification can indicate that the object is partially occluded (e.g., partially obscured by another object) or may indicate a classification (e.g., type of the object) along with a confidence interval for the classification in order to convey a strength of the determination. As such, the identification module 230 reviews the classification and, when the classification indicates one of the noted conditions, proceeds to refine the classification. In one embodiment, the identification module 230 refines the classification by considering the audio data in combination with the feature data. That is, for example, the identification module 230 provides the raw audio data as an input to the deep learning algorithm 260 in addition to providing the feature data. Consequently, the deep learning algorithm can process temporal aspects of the audio data along with images or other perceived information to identify the object and provide a classification.

In one embodiment, the deep learning algorithm 260 process the audio data to determine whether audio signatures associated with the object are present. The audio signatures are, for example, distinctive sounds that correlate with the object. For example, a bicycle can make a distinctive whizzing sound as the chain spins the tires. Additional examples of audio signatures that correlate with objects can include engine noises for different vehicles, sirens, children playing, speech, skateboards rolling across pavement, birds singing, and so on. In general, the identification module 230 processes the audio data using the deep learning algorithm in order to determine additional aspects of an object that can improve identification and thus the generation of the classification. As a further matter, the audio data and the feature data may be processed in unison by the deep learning algorithm 260 so that the deep learning algorithm can use learned correlations for identified aspects of the audio data to further identify the object. Once the identification module 230 regenerates the classification, the identification module 230 can provide the classification to one or more of the vehicle systems 140 or another aspect of the vehicle 100 to improve the functioning of the noted system and control the vehicle 100 through improved awareness of the surrounding environment.

Figure 4:
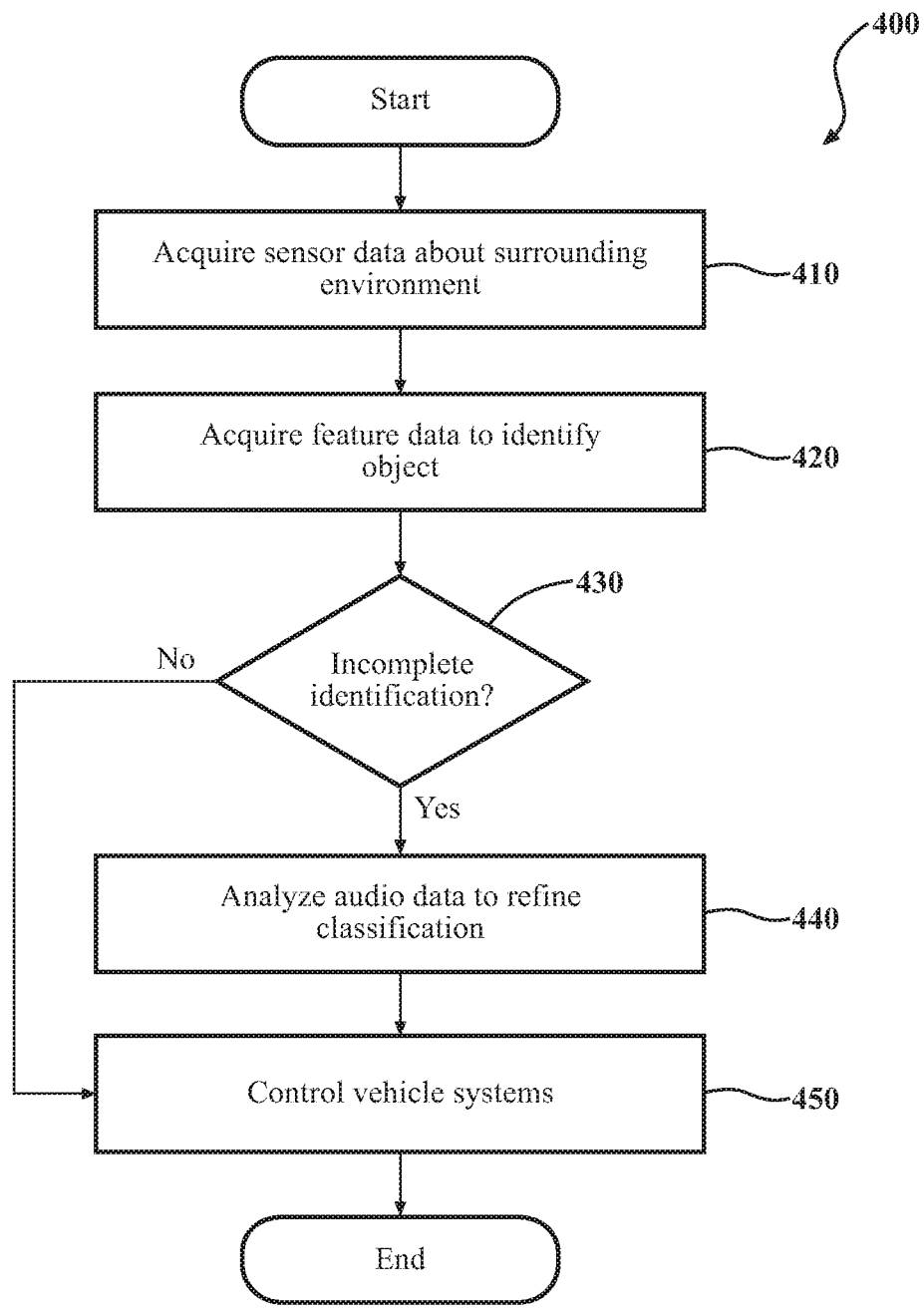
FIG. 4 is one example of a method that is associated with using audio data to improve object detection when identification of an object is incomplete.

Additional aspects of detecting occluded objects will be discussed in relation to FIG. 4. FIG. 4 illustrates a flowchart of a method 400 that is associated with using audio data to identify objects. Method 400 will be discussed from the perspective of the fusion system 170 of FIGS. 1 and 2. While method 400 is discussed in combination with the fusion system 170, it should be understood that the method 400 is not limited to being implemented within the fusion system 170, but is instead one example of a system that may implement the method 400.

At 410, the monitoring module 220 acquires the sensor data 250. In general, the monitoring module 220 continuously acquires the sensor data 250 in order to continually update a perception of the surrounding environment. Thus, while the method 400 is discussed in a generally serial manner, it should be appreciated that the fusion system 170 can execute multiple iterations of the method 400 in order to maintain awareness of the surrounding environment. Moreover, because certain aspects of the sensor data 250 are temporal in nature (e.g., the audio data), the monitoring module 220 can continuously acquire the sensor data 250 and maintain the sensor data 250 as a temporal stream of data. Thus, the monitoring module 220 acquires the sensor data 250 from the microphones and other various sensors of the vehicle 100 and stores the sensor data 250 for analysis.

At 420, the monitoring module 220 analyzes the feature data. In one embodiment, the monitoring module 220 uses the feature data as an electronic input to the deep learning algorithm 260. The deep learning algorithm 260 is, for example, a convolutional neural network (CNN) or another machine learning approach that has been trained to perform, for example, image recognition, point cloud feature analysis, or a similar approach on whichever single sensor input or combination of sensor inputs that is provided thereto. Accordingly, as a general matter, the monitoring module 220 implements the deep learning algorithm 260 to detect and classify objects as embodied in the perceived sensor data 250.

In one embodiment, the classification indicates at least characteristics about a shape and size of the object. However, in further aspects, the classification may also include further identifying indicia such as color, a specific model of the shape, or other identifying information. Moreover, the classification can indicate a confidence interval for aspects of the object, aspects about immediate surroundings of the object (e.g., partially occluded or not), and so on.

At 430, the identification module 230 determines whether the identification performed at block 420 is incomplete. That is, in one embodiment, the identification module 230 reviews the classification to determine whether the classification indicates that the object is not identified or identified to a certainty that is useful to the vehicle systems 140. Thus, the identification module 230 analyzes the classification to determine whether the classification indicates the object is partially occluded and thus cannot be identified using the feature data alone. In further aspects, the identification module 230 compares an indicated confidence interval for an identified classification with a threshold.

Accordingly, if the identification module 230 determines that the confidence interval satisfies (e.g., exceeds) the threshold, then the identification module 230 proceeds to controlling one or more vehicle systems 140 as noted at block 450. Thus, the noted threshold is essentially a non-detection threshold below which the previous analysis that produced the classification is not given meaningful weight. As such, the identification module 230 refines the classification as indicated at block 440 when the provided classification is not correlated with a sufficient confidence interval.

At 440, the identification module 230 refines the classification produced at 420 by using the audio data in addition to the feature data to produce the classification. In general, the identification module 230 uses the audio data to further inform identification of the object and thus improve a likelihood of identifying the object when circumstances are not otherwise ideal (e.g., partially occluded). Thus, in one embodiment, the identification module 230 provides the audio data that correlates with the object along with the feature data into the deep learning algorithm 260. As an initial note in relation to the audio data, the identification module 230 can generally identify the audio data that correlates with the particular object in several different ways. In one aspect, the identification module 230 uses audio data from a microphone that is closest to the object (e.g., microphone 320 for an object located at 1 o'clock from the vehicle 100). Moreover, in one embodiment, the identification module 230 uses audio data from all microphones, but that temporally correlates with a timestamp of the feature data in an attempt to grasp a signature of the object. In still further aspects, the identification module 230 localizes the object using a comparison of audio data from multiple ones of the microphones and thus then proceeds to filter audio relating particularly to the object from an audio stream according to the known location.

In either case, the identification module 230, in one embodiment, can use a separate deep learning algorithm for the different types of data. Thus, a general structure of the network for processing the combined audio and feature data may include initially processing the audio data using a recurrent neural network (RNN) and using an output of the RNN as an input to another neural network (e.g., CNN) along with the feature data or processing the feature data first and providing the audio data along with an output of the CNN to the RNN. Moreover, in further aspects, a single deep learning network can be implemented to accept the inputs simultaneously and provide a revised classification as an electronic output. In this way, the fusion system 170 improves identification of objects using a fusion of different sensor data and thus also improves the functioning of the vehicle 100 through improved awareness of the surrounding environment that can be leveraged by various vehicle systems.

At 450, the identification module 230 controls one or more vehicle systems 140 of the vehicle 100 according to the classification. In one embodiment, the identification module 230 uses the classification to update a feature map or other representation of the surrounding environment that is generally referenced by various ones of the vehicle systems 140 and/or the autonomous driving module 160. Accordingly, the identification module 230 can indirectly control the noted systems to adjust or otherwise improve path planning, obstacle avoidance, and other functions through generating an improved mapping of the surrounding environment. In further aspects, the identification module 230 can directly induce the systems by providing electronic indications to the systems about the classifications for the objects and thereby cause the systems to account for the noted object.

Moreover, in one embodiment, the identification module 230 can additionally, or alternatively, provide alerts, warnings, displays or other indications to occupants of the vehicle 100 about the object. Thus, the identification module 230 can provide information directly to one or more occupants of the vehicle 100 in order to improve a situational awareness of the occupants/operator.

Figure 5:
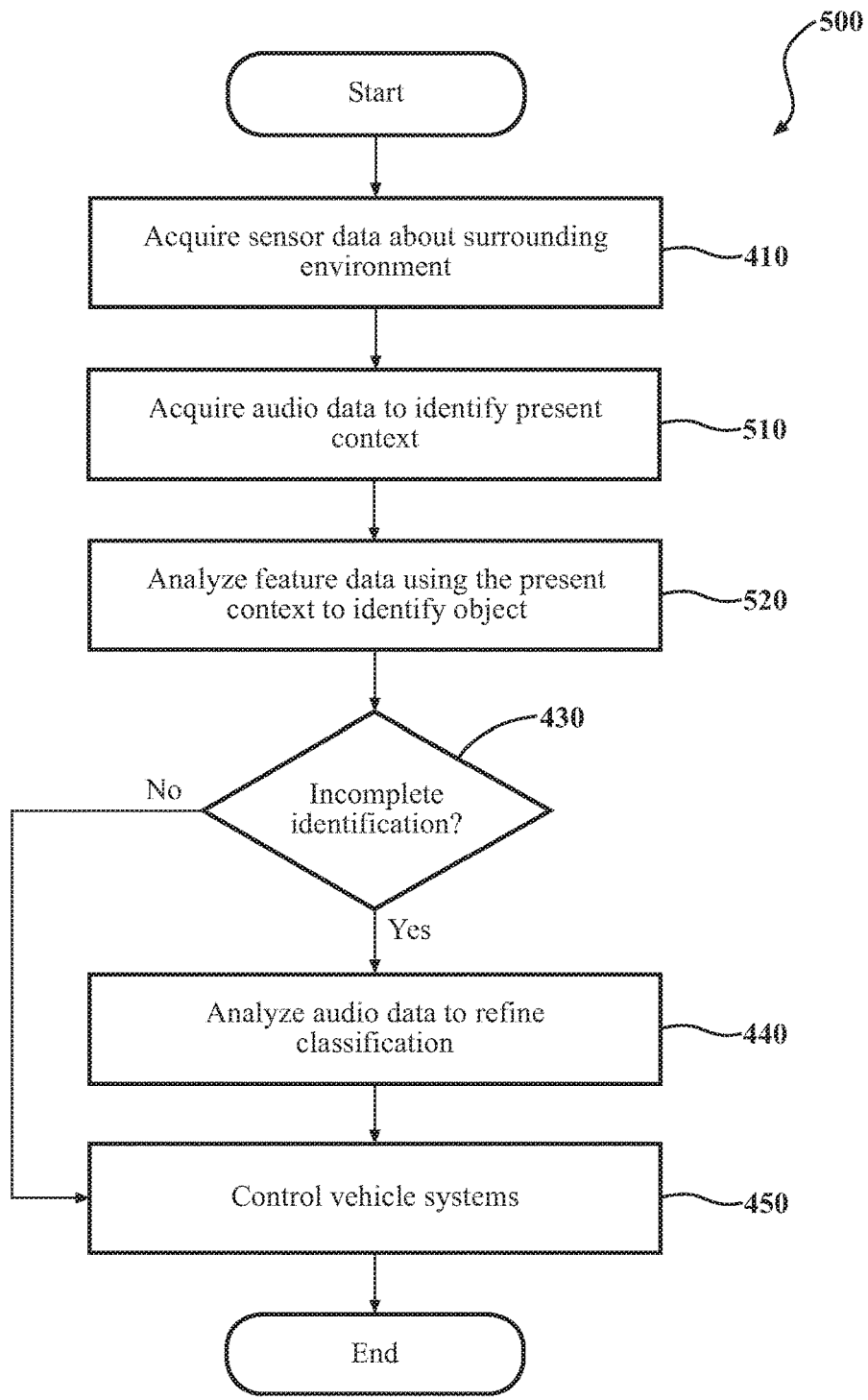
FIG. 5 is one example of a method that is associated with determining a present context of a vehicle using audio data in order to improve identification of an object.

Further consider FIG. 5, which illustrates a method 500 that is associated with using audio data to identify objects. Method 500 is similar to method 400 of FIG. 4 and thus will be discussed from the perspective of the fusion system 170 of FIGS. 1 and 2. While method 500 is discussed in combination with the fusion system 170, it should be understood that the method 500 is not limited to being implemented within the fusion system 170, but is instead one example of a system that may implement the method 500. Moreover, an in-depth discussion of blocks 410, 430, 440, and 450 will not be provided since the basic functionality associated with the noted blocks is discussed in relation to method 400.

In either case, as with method 400, method 500 begins with the acquisition of the sensor data 250 at 410. For purposes of brevity the discussion of block 410 will not be repeated, however, it should be understood that the monitoring module 220 controls the vehicle sensors 120 and the audio system 180 or passively obtains the sensor data 250 from the sensors 120/180 in order to execute the subsequently discussed identification.

At 510, the monitoring module 220 analyzes the audio data to identify a present context associated with the surrounding environment. As a general matter, the monitoring module 220 can analyze the audio data at 510 to determine different aspects of the surrounding environment. For example, identifying the present context can include determining objects that are likely present as a general characterization of the surrounding environment form the audio data, localizing particular sounds from the audio data that are associated with particular objects, or otherwise characterizing the surrounding environment to provide additional information for subsequently classifying objects in the surrounding environment.

Thus, in one embodiment, the monitoring module 220 can use the deep learning algorithm 260 or a separate machine learning algorithm to analyze the audio data and generate the present context. In general, the present context includes identifiers of characteristics of the surrounding environment and/or of particular objects in the surrounding environment as determined from the audio data. Accordingly, as one example, the present context may indicate a general characterization of the surrounding environment as rural, suburban, industrial, highway, residential, urban, school zone, and so on. Moreover, the present context can indicate the presence of traffic, particular audio signatures such as children, sirens, and so on. By identifying the noted aspects of the surrounding environment prior to analyzing the feature data to identify particular objects, the fusion system 170 further informs the identification of the objects and thus improves a likelihood of identifying objects in the surrounding environment via providing the additional contextual information. As a further note, localizing the objects according to the audio data can also provide for more precise selection of the feature data that relates to the object and thus improved identification of the object.

At 520, the monitoring module 220 analyzes the feature data using the present context and the deep learning algorithm 260. As previously indicated, in one embodiment, the deep learning algorithm 260 is a CNN that accepts the feature data as an electronic input and produces a classification of an object as an output. However, at 520, the deep learning algorithm 260, whether a CNN or another machine learning algorithm, accepts both the feature data and the present context produced at 510. Accordingly, the resulting classification produced by the algorithm 260 is generated with consideration of the present context. In this way, the monitoring module 220 can improve initial classification of objects using the audio data. After producing the classification, the fusion system 170 proceeds with blocks 430-450 in the same manner as discussed in relation to method 400. Accordingly, the identification module 230, in one embodiment, still analyzes the classification at 430 to determine whether the classification is incomplete or not and thus may proceed with further analysis of the audio data and the feature data at 440 in order to refine the classification, if necessary.

Figure 6:
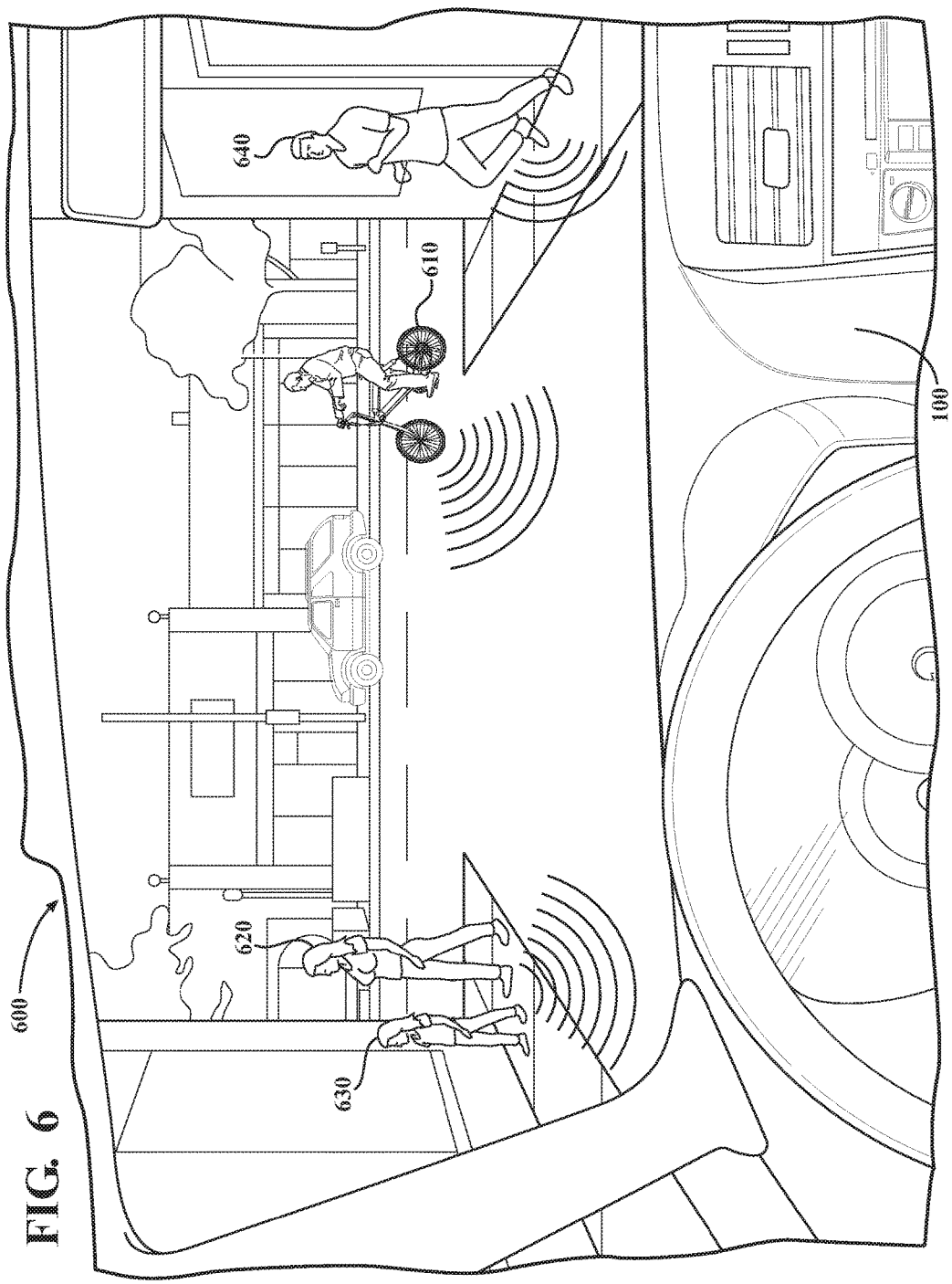
FIG. 6 is an example view of objects perceived by the vehicle.

As a further example of how the fusion system 170 operates, FIGS. 6-7 will now be discussed. FIG. 6 illustrates an example view through a windshield of the vehicle 100 into the surrounding environment. As shown in FIG. 6, a person riding a bicycle 610 is crossing a street in front of the vehicle 100 while an adult 620 and a child 630 walk along an opposing sidewalk. Additionally, the view 600 includes a jogger 640 that is running toward the intersection. Accordingly, audio data of the surrounding environment embodied within the view 600 includes such sounds as the child 630 screaming/yelling/laughing, the bicycle 610 whizzing ahead, the jogger 640 running along the sidewalk, and so on. Moreover, as an additional aspect, it should be appreciated that the sounds from the noted objects are each localized within a particular region and thus have characteristics specific to the area such as may be induced within the sound waves from reflecting off of particular types of surfaces or other nearby objects. Accordingly, the fusion system 170 can also identify additional aspects of the surrounding environment through induced characteristics of the sound waves (e.g., presence of hardscape, buildings, grassy areas, enclosed areas, etc.).

In either case, the audio data from the noted scene further informs a present context when executing the initial analysis as shown in relation to method 500. Moreover, the audio data is also useful in further refining the classifications as noted in relation to block 440 with both method 400 and method 500. Whichever approach is undertaken, the fusion system 170 uses the audio data to supplement the analysis and improve identification of the objects.

Figure 7:
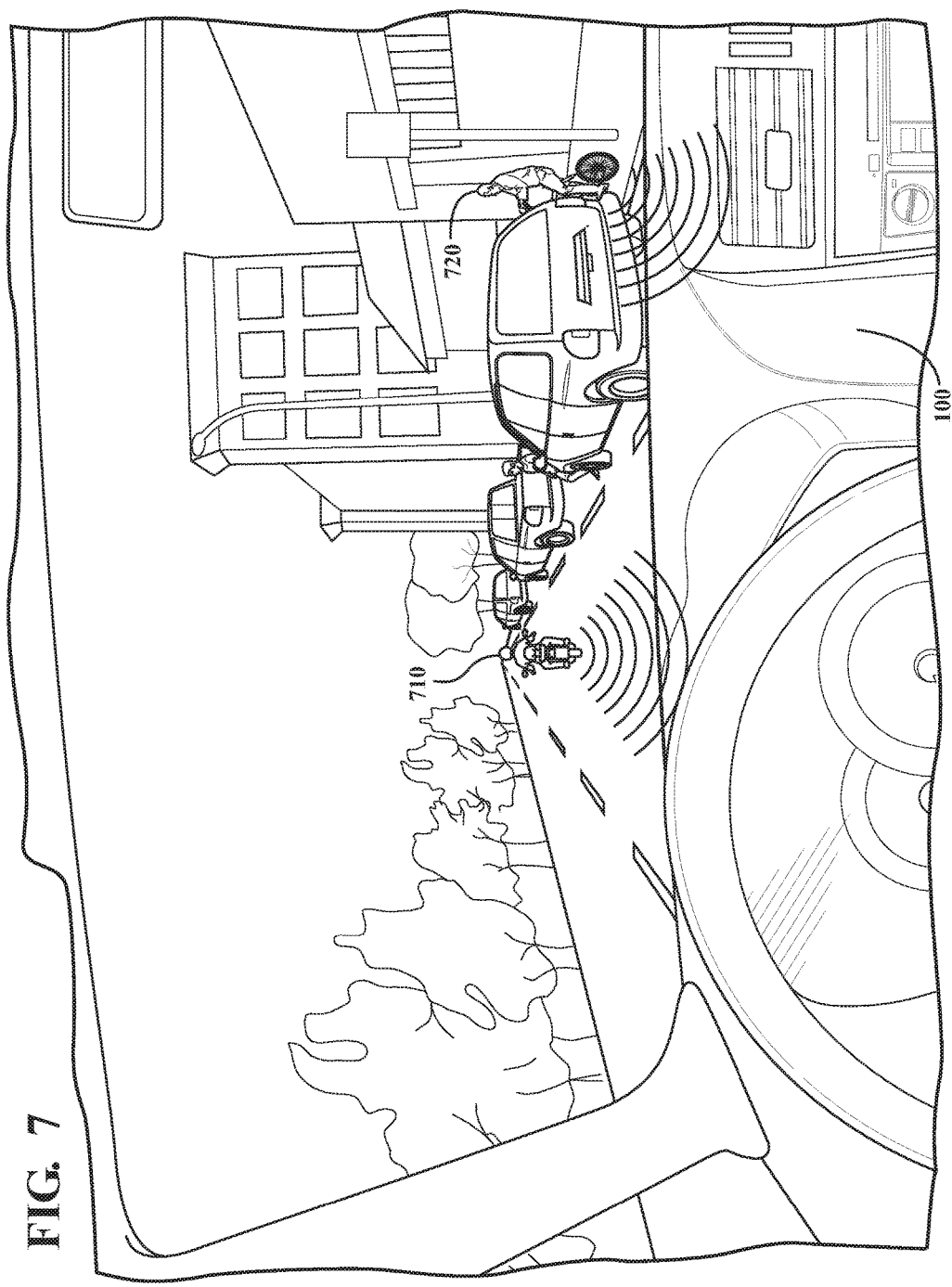
FIG. 7 is another example view from a vehicle of objects perceived by sensors of the vehicle.

As a further example, FIG. 7 illustrates another example view 700 of a different scene. As illustrated in the view 700 a motorcycle 710 is driving ahead of the vehicle 100 while a bicyclist 720 is moving along an adjacent sidewalk. Both the motorcycle 710 and the bicyclist 720 represent objects that may be difficult to classify/identify using, for example, image data alone. That is, because the motorcycle 710 has such a limited rear profile and the bicyclist 720 is partially occluded, the image data provides limited information about the objects. Accordingly, as one example, when the initial classification at 420 is determined to be incomplete at 430, the identification module can refine the classification according to signatures of the respective objects from the audio data distinctive to the objects that improves the classification. In this way, occluded objects or objects with difficult to perceive profiles can be identified thereby improving situational awareness about the vehicle 100.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., a human operator). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human operator. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., operator) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g. a operator or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the fusion system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the fusion system 170, and/or the autonomous driving module(s) 160 may control some or all of these vehicle systems 140 and, thus, may be partially or fully autonomous.

The processor(s) 110, the fusion system 170, and/or the autonomous driving module(s) 160 can be operatively connected to communicate with the various vehicle systems 140 and/or individual components thereof. For example, returning to FIG. 1, the processor(s) 110, the fusion system 170, and/or the autonomous driving module(s) 160 can be in communication to send and/or receive information from the various vehicle systems 140 to control the movement, speed, maneuvering, heading, direction, etc. of the vehicle 100. The processor(s) 110, the fusion system 170, and/or the autonomous driving module(s) 160 may control some or all of these vehicle systems 140.

The processor(s) 110, the fusion system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the fusion system 170, and/or the autonomous driving module(s) 160 can control the direction and/or speed of the vehicle 100. The processor(s) 110, the fusion system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). In one embodiment, the fusion system 170 can collect data about control signals from the processor 110 and the autonomous driving module 160 that cause the vehicle to accelerate, decelerate, and perform other various maneuvers and/or why the autonomous driving module 160 induced the maneuvers. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the presence of obstacles, the location of obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the fusion system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A fusion system for identifying aspects of a surrounding environment of a vehicle comprising:
   one or more processors;
   a memory communicably coupled to the one or more processors and storing:
   a monitoring module including instructions that when executed by the one or more processors cause the one or more processors to, in response to acquiring audio data from at least one microphone integrated with the vehicle and feature data from at least one sensor of the vehicle, analyze, using a deep learning algorithm, the feature data to generate a classification of an object embodied by the feature data, the classification including a confidence interval; and
   an identification module including instructions that when executed by the one or more processors cause the one or more processors to selectively refine the classification using the deep learning algorithm as a function of at least the audio data by regenerating the classification using the feature data and the audio data when at least one of: the confidence interval satisfies a non-detection threshold, and the classification indicates the object is partially occluded, wherein the classification identifies at least characteristics about a shape and size of the object; and
   wherein the identification module further includes instructions to control one or more vehicle systems of the vehicle according to the classification.

2. The fusion system of claim 1, wherein the identification module includes the instructions to selectively refine the classification including instructions to generate the classification as a function of the audio data, wherein the identification module includes the instructions to selectively refine the classification using the deep learning algorithm including instructions to use at least two neural networks that form the deep learning algorithm, and wherein the confidence interval defines a strength of the classification.

3. The fusion system of claim 1, wherein the feature data includes at least one or more visible light images, and wherein the at least one sensor is a camera, wherein the deep learning algorithm includes at least two neural networks that form the deep learning algorithm, the at least two neural networks including a recurrent neural network (RNN) to process the audio data, and a convolutional neural network (CNN) to process the feature data and an output of the RNN.

4. The fusion system of claim 1, wherein the monitoring module includes the instructions to analyze the feature data including instructions to use the feature data as an electronic input to the deep learning algorithm that is a convolutional neural network (CNN) to analyze the feature data.

5. The fusion system of claim 4, wherein the identification module includes the instructions to selectively refine the classification including instructions to provide the classification and the audio data to a recurrent neural network (RNN) and obtaining an electronic output as the classification that accounts for the audio data in generating the classification, and
   wherein the identification module includes the instructions to selectively refine the classification including instructions to regenerate the classification using the audio data when the classification initially indicates that the object is partially occluded.

6. The fusion system of claim 1, wherein the monitoring module includes instructions to, prior to analyzing the feature data to generate the classification, analyze the audio data to identify a present context associated with the surrounding environment, wherein the present context indicates aspects relating to objects that are likely present in the surrounding environment,
   wherein the monitoring module includes the instructions to analyze the feature data including instructions to analyze the present context in combination with the feature data to generate the classification,
   wherein the monitoring module includes the instructions to analyze the audio data including instructions to localize the object in the surrounding environment in relation to the vehicle, and wherein the audio data includes information from at least two microphones.

7. The fusion system of claim 1, wherein the at least one microphone is integrated with the vehicle to acquire the audio data of the surrounding environment outside of the vehicle, wherein the at least one sensor includes a light detection and ranging (LIDAR) sensor that is integrated with the vehicle, and wherein the feature data includes point cloud data.

8. The fusion system of claim 1, wherein the identification module refines the classification by using the audio data to supplement how the deep learning algorithm determines the classification.

9. A non-transitory computer-readable medium storing for identifying aspects of a surrounding environment of a vehicle and including instructions that when executed by one or more processors cause the one or more processors to:
   in response to acquiring audio data from at least one microphone integrated with the vehicle and feature data from at least one sensor of the vehicle, analyze, using a deep learning algorithm, the feature data to generate a classification of an object embodied by the feature data, the classification including a confidence interval; and
   selectively refine the classification using the deep learning algorithm as a function of at least the audio data by regenerating the classification using the feature data and the audio data when at least one of: the confidence interval satisfies a non-detection threshold, and the classification indicates the object is partially occluded, wherein the classification identifies at least characteristics about a shape and size of the object; and
   control one or more vehicle systems of the vehicle according to the classification.

10. The non-transitory computer-readable medium of claim 9, wherein the instructions to selectively refine the classification include instructions to generate the classification as a function of the audio data, wherein the deep learning algorithm includes at least two neural networks that form the deep learning algorithm, and wherein the confidence interval defines a strength of the classification.

11. The non-transitory computer-readable medium of claim 9, wherein the instructions to analyze the feature data include instructions to use the feature data as an electronic input to the deep learning algorithm that is a convolutional neural network (CNN) to analyze the feature data,
- wherein the instructions to selectively refine the classification include instructions to provide the classification and the audio data to a recurrent neural network (RNN) and obtain an electronic output as the classification that accounts for the audio data in generating the classification, and
- wherein the instructions to selectively refine the classification including instructions to regenerate the classification using the audio data when the classification initially indicates that the object is partially occluded.

12. The non-transitory computer-readable medium of claim 9, further comprising instructions to:
- prior to analyzing the feature data to generate the classification, analyze the audio data to identify a present context associated with the surrounding environment, wherein the present context indicates aspects relating to objects that are likely present in the surrounding environment,
- wherein the instructions to analyze the feature data include instructions to analyze the present context in combination with the feature data to generate the classification,
- wherein the instructions to analyze the audio data include instructions to localize the object in the surrounding environment in relation to the vehicle, and wherein the audio data includes information from at least two microphones.

13. The non-transitory computer-readable medium of claim 9, wherein the at least one microphone is integrated with the vehicle to acquire the audio data of the surrounding environment outside of the vehicle, wherein the at least one sensor includes a light detection and ranging (LIDAR) sensor that is integrated with the vehicle, and wherein the feature data includes point cloud data.

14. A method of identifying aspects of a surrounding environment of a vehicle, comprising:
- in response to acquiring audio data from at least one microphone integrated with the vehicle and feature data from at least one sensor of the vehicle, analyzing, using a deep learning algorithm, the feature data to generate a classification of an object embodied by the feature data, the classification including a confidence interval;
- selectively refining the classification using the deep learning algorithm as a function of at least the audio data by regenerating the classification using the feature data and the audio data when at least one of: the confidence interval satisfies a non-detection threshold, and the classification indicates the object is partially occluded, wherein the classification identifies at least characteristics about a shape and size of the object; and
- controlling one or more vehicle systems of the vehicle according to the classification.

15. The method of claim 14, wherein selectively refining the classification includes generating the classification as a function of the audio data, wherein selectively refining the classification using the deep learning algorithm includes using at least two neural networks that form the deep learning algorithm, and wherein the confidence interval defines a strength of the classification.

16. The method of claim 14, wherein the feature data includes at least one or more visible light images, and wherein the at least one sensor is a camera.

17. The method of claim 14, wherein analyzing the feature data includes using the feature data as an electronic input to the deep learning algorithm that is a convolutional neural network (CNN).

18. The method of claim 17, wherein selectively refining the classification includes providing the classification and the audio data to a recurrent neural network (RNN) and obtaining an electronic output as the classification that accounts for the audio data in generating the classification, and
- wherein selectively refining the classification includes regenerating the classification using the audio data when the classification initially indicates that the object is partially occluded.

19. The method of claim 14, further comprising:
- prior to analyzing the feature data to generate the classification, analyzing the audio data to identify a present context associated with the surrounding environment, wherein the present context indicates aspects relating to objects that are likely present in the surrounding environment,
- wherein analyzing the feature data includes analyzing the present context in combination with the feature data to generate the classification, and
- wherein analyzing the audio data includes localizing the object in the surrounding environment in relation to the vehicle, wherein the audio data includes information from at least two microphones.

20. The method of claim 14, wherein the at least one microphone is integrated with the vehicle to acquire the audio data of the surrounding environment outside of the vehicle, wherein the at least one sensor includes a light detection and ranging (LIDAR) sensor that is integrated with the vehicle, and wherein the feature data includes point cloud data.

* * * * *

UNITED STATES PATENT AND TRADEMARK OFFICE
CERTIFICATE OF CORRECTION

PATENT NO. : 10,445,597 B2
APPLICATION NO. : 15/786106
DATED : October 15, 2019
INVENTOR(S) : Astrid Glende Jackson Page 1 of 1

It is certified that error appears in the above-identified patent and that said Letters Patent is hereby corrected as shown below:

In the Specification

Column 8, Line 12:
Change "process the audio data" to "processes the audio data"

Column 10, Line 65:
Change the word "form" to "from"

In the Claims

Column 20, Line 7:
Change "obtaining an electronic output" to "obtain an electronic output" in Claim 5

Column 20, Line 42:
Add the word "instructions" between "storing" and "for" in Claim 9

Signed and Sealed this
Twenty-fifth Day of February, 2020

Andrei Iancu
*Director of the United States Patent and Trademark Office*